US010967708B2

(12) United States Patent
Akiyama

(10) Patent No.: US 10,967,708 B2
(45) Date of Patent: Apr. 6, 2021

(54) DOOR DRIVE DEVICE

(71) Applicant: KEIHIN CORPORATION, Tokyo (JP)

(72) Inventor: Shingo Akiyama, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 175 days.

(21) Appl. No.: 16/454,571

(22) Filed: Jun. 27, 2019

(65) Prior Publication Data

US 2020/0001684 A1 Jan. 2, 2020

(30) Foreign Application Priority Data

Jun. 29, 2018 (JP) .............................. JP2018-124479

(51) Int. Cl.
*B60H 1/00* (2006.01)
(52) U.S. Cl.
CPC ................ *B60H 1/00857* (2013.01)
(58) Field of Classification Search
CPC ............ B60H 1/00857; B60H 1/00692; B60H 1/00514
See application file for complete search history.

(56) References Cited

U.S. PATENT DOCUMENTS

| | | | | |
|---|---|---|---|---|
| 6,305,462 B1 * | 10/2001 | Tsurushima | ......... | B60H 1/0005 165/103 |
| 8,777,705 B2 * | 7/2014 | Nomura | ............. | B60H 1/00692 454/160 |
| 2009/0197517 A1 * | 8/2009 | Wang | ................. | B60H 1/00692 454/145 |

FOREIGN PATENT DOCUMENTS

JP 2004-203064 7/2004

* cited by examiner

*Primary Examiner* — Jessica Yuen
(74) *Attorney, Agent, or Firm* — Rankin, Hill & Clark LLP

(57) ABSTRACT

A door drive mechanism used for a vehicle air conditioning device includes a link mechanism connected to first and second shafts. The link mechanism includes a base member secured to an air conditioner case. The base member includes first and second shaft holes in which first and second shafts are inserted, guide grooves formed around the first and second shaft holes and configured to allow positioning portions to be inserted into the respective guide grooves, and guide portions including inclined surfaces configured to guide the positioning portions to the guide grooves. Moreover, the first and second shafts include the positioning portions protruding radially outward at positions closer to distal ends thereof than first gear portions.

14 Claims, 6 Drawing Sheets

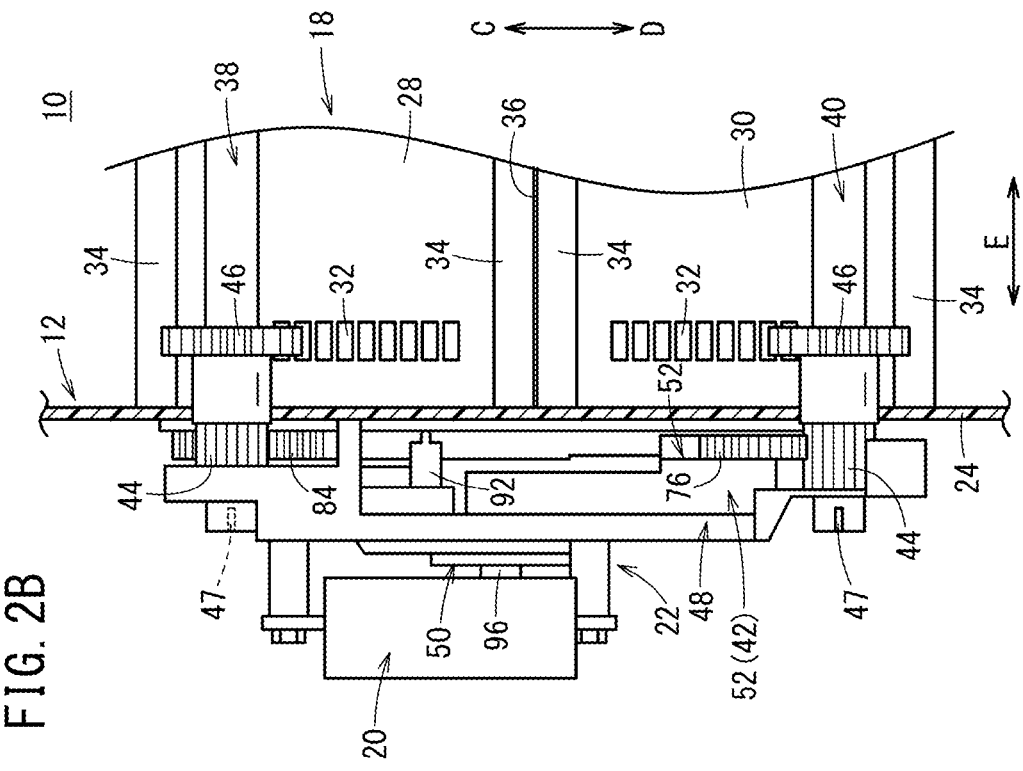
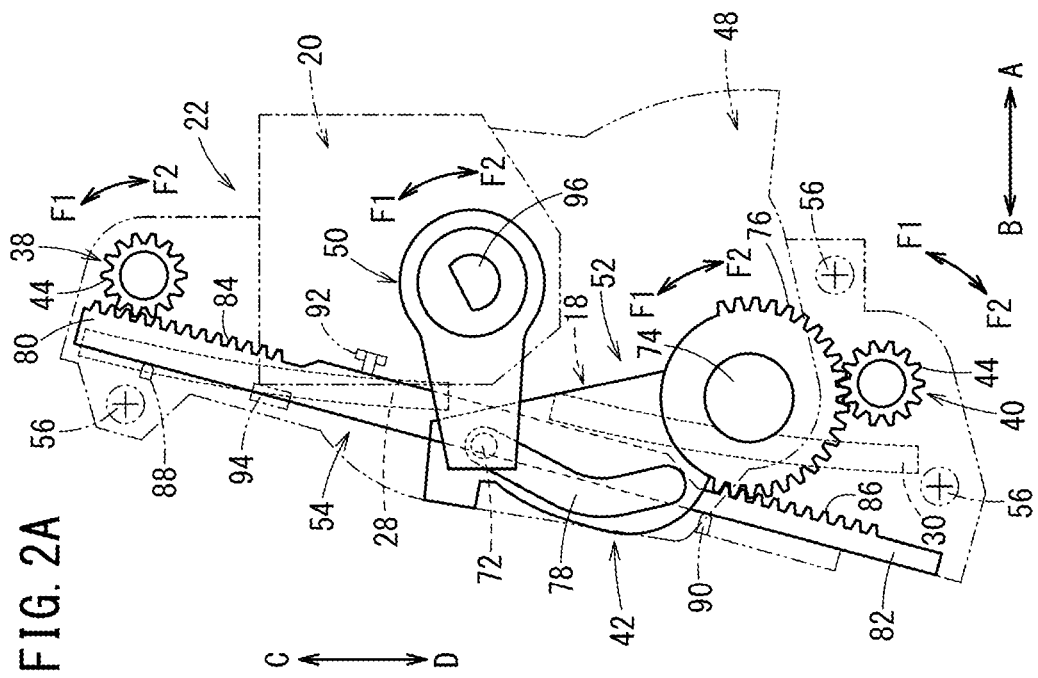

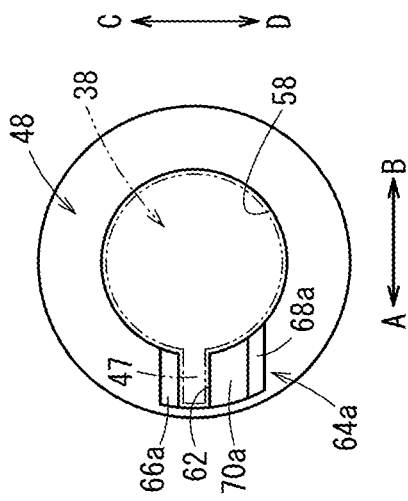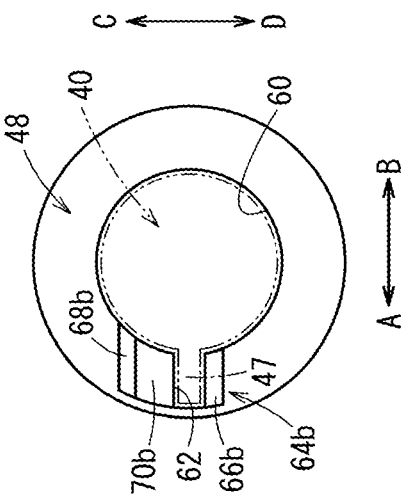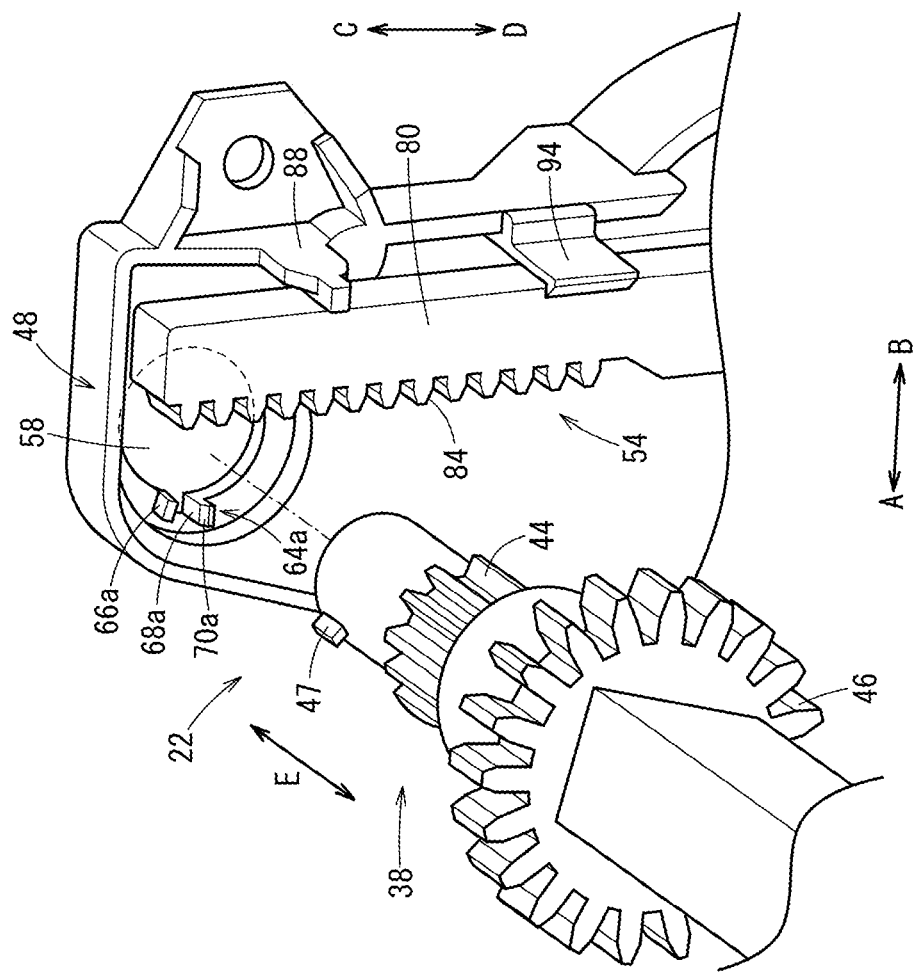

DOOR DRIVE DEVICE

CROSS-REFERENCE TO RELATED APPLICATION

This application is based upon and claims the benefit of priority from Japanese Patent Application No. 2018-124479 filed on Jun. 29, 2018, the contents of which are incorporated herein by reference.

BACKGROUND OF THE INVENTION

Field of the Invention

The present invention relates to a door drive device configured to transmit driving force of a drive unit to a plurality of doors in a vehicle air conditioning device to thereby open and close the doors.

Description of the Related Art

Conventional vehicle air conditioning devices include a plurality of doors inside an air conditioner case and a door drive device transmitting driving force from drive unit to the doors to thereby switch a flowing state of air flowing through flow channels.

As disclosed in, for example, Japanese Laid-Open Patent Publication No. 2004-203064, such a door drive device includes a casing disposed on a side of an air conditioning unit and a link mechanism housed inside the casing and driving a plurality of doors. The link mechanism is provided with a driving lever directly driven by a drive motor, and also provided with first and second driven levers engaged with the driving lever via intermediate rods to pivot. An end of the first driven lever protrudes outside the casing to be connected to a drive shaft of an air mixing door, and an end of the second driven lever protrudes outside the casing to be connected to a drive shaft of a door to an air outlet through which air is sent to an upper part of a passenger in a rear seat (hereinafter referred to as "rear face door").

The driving force of the drive motor transmitted to the first and second driven levers via the driving lever and the intermediate rods rotates the drive shafts. The rotation causes the air mixing door and the rear face door to open and close, allowing the flowing state of the air flowing inside the air conditioner case to be switched.

SUMMARY OF THE INVENTION

In the above-described door drive device including the link mechanism, the drive shaft of the air mixing door is directly connected to the first driven lever, and the drive shaft of the rear face door is directly connected to the second driven lever. Thus, for example, it is impossible to increase the opening and closing amounts of the doors by increasing the rotational amounts of the drive shafts beyond the permissible amounts of rotation of the first and second driven levers.

In this case, for example, the drive shafts may be meshed with the first and second driven levers using gears and toothed portions, and the driving force from the drive motor may be amplified and transmitted to the first and second driven levers and the drive shafts via the gears and the toothed portions to thereby increase the amounts of rotation of the drive shafts.

However, in the above-described structure, when the drive shafts are meshed with the first and second driven levers, the gears and the toothed portions need to be in a predetermined positional relationship. This reduces the ease of assembly. Moreover, in a case where the gears and the toothed portions are provided with a larger tooth thickness or a specific shape in order to prevent incorrect assembly, for example, the toothed portions and the gears may not be sufficiently meshed with each other. This may cause disengagement due to an increased operating resistance or a reduction in transmission efficiency in transmitting the driving force from the first and second driven levers to the drive shafts.

A general object of the present invention is to provide a door drive device, which is, with a simple structure, capable of preventing incorrect assembly to increase the ease of assembly and capable of increasing the efficiency in transmitting driving force.

According to an aspect of the present invention, a door drive device includes an air conditioner case including a channel inside the air conditioner case, a plurality of doors disposed in the channel and configured to adjust an opening degree of the channel, a plurality of door drive shafts configured to drive the doors, and a link unit connected to the door drive shafts, wherein the link unit includes a drive unit, a base member secured to the air conditioner case, and a plurality of levers supported by the base member, wherein each of the door drive shafts includes a toothed portion and a positioning portion, the toothed portion being disposed in a vicinity of an end of the door drive shaft and configured to mesh with the link unit, the positioning portion being disposed between the toothed portion and the end so as to be spaced away from the toothed portion by a predetermined distance and to protrude radially outward, wherein the base member includes insertion holes in which the door drive shafts are inserted respectively, groove portions formed around the respective insertion holes and configured to allow the respective positioning portions to be inserted into the respective groove portions, and guide portions including respective inclined portions configured to guide the respective positioning portions to the respective groove portions, and wherein a distance between each of the positioning portions and each of the toothed portions is larger than a length of each of the guide portions, in an axial direction of each of the door drive shafts.

According to the present invention, in the door drive device for driving the door disposed in the channel inside the air conditioner case, the door drive shaft driving the door includes the toothed portion disposed in the vicinity of the end of the door drive shaft and meshing with the link unit, and also includes the positioning portion protruding radially outward at the position separated away from the toothed portion in the direction toward the end. Moreover, the base member of the link unit includes the insertion hole in which the door drive shaft is inserted, the groove portion formed around the insertion hole and into which the positioning portion can be inserted, and the guide portion including the inclined surface (inclined portion) guiding the positioning portion to the groove portion.

Thus, when the door drive shaft is inserted into the insertion hole of the base member, the door drive shaft and the base member are appropriately positioned by guiding and inserting the positioning portion into the groove portion along the guide portion. This enables easy and reliable engagement of the toothed portion with the link unit at a predetermined position. Moreover, the door drive shaft can be supported to be rotatable with respect to the base member while the toothed portion is meshed with the link unit, by setting the distance between the positioning portion and the toothed portion to be larger than the length of the guide portion provided on the insertion hole in the door drive shaft.

As a result, the toothed portion of the door drive shaft does not require a larger tooth thickness or a specific shape, and with the simple structure including the door drive shaft with the positioning portion and the insertion hole in the base member with the groove portion and the guide portion, the door drive shaft can be positioned with respect to the base member and the toothed portion can be reliably meshed with and assembled to the link unit, without incorrect assembly. This increases the ease of assembly. Moreover, operating resistance of the door drive shaft can be reduced compared with the case where the toothed portion has a larger tooth thickness or a specific shape, thereby resulting in an increase in transmission efficiency in transmitting the driving force to the door drive shaft.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2A is a partially omitted enlarged front view of the door drive device illustrated in FIG. 1;

FIG. 2B is an enlarged side view of the door drive device;

FIG. 3A is an exploded perspective view of the door drive device illustrated in FIG. 2A and a first shaft in a disassembled state;

FIG. 3B is an enlarged front view of a base member in the vicinity of a first shaft hole;

FIG. 3C is an enlarged front view of the base member in the vicinity of a second shaft hole;

DESCRIPTION OF THE PREFERRED EMBODIMENTS

Figure 1:
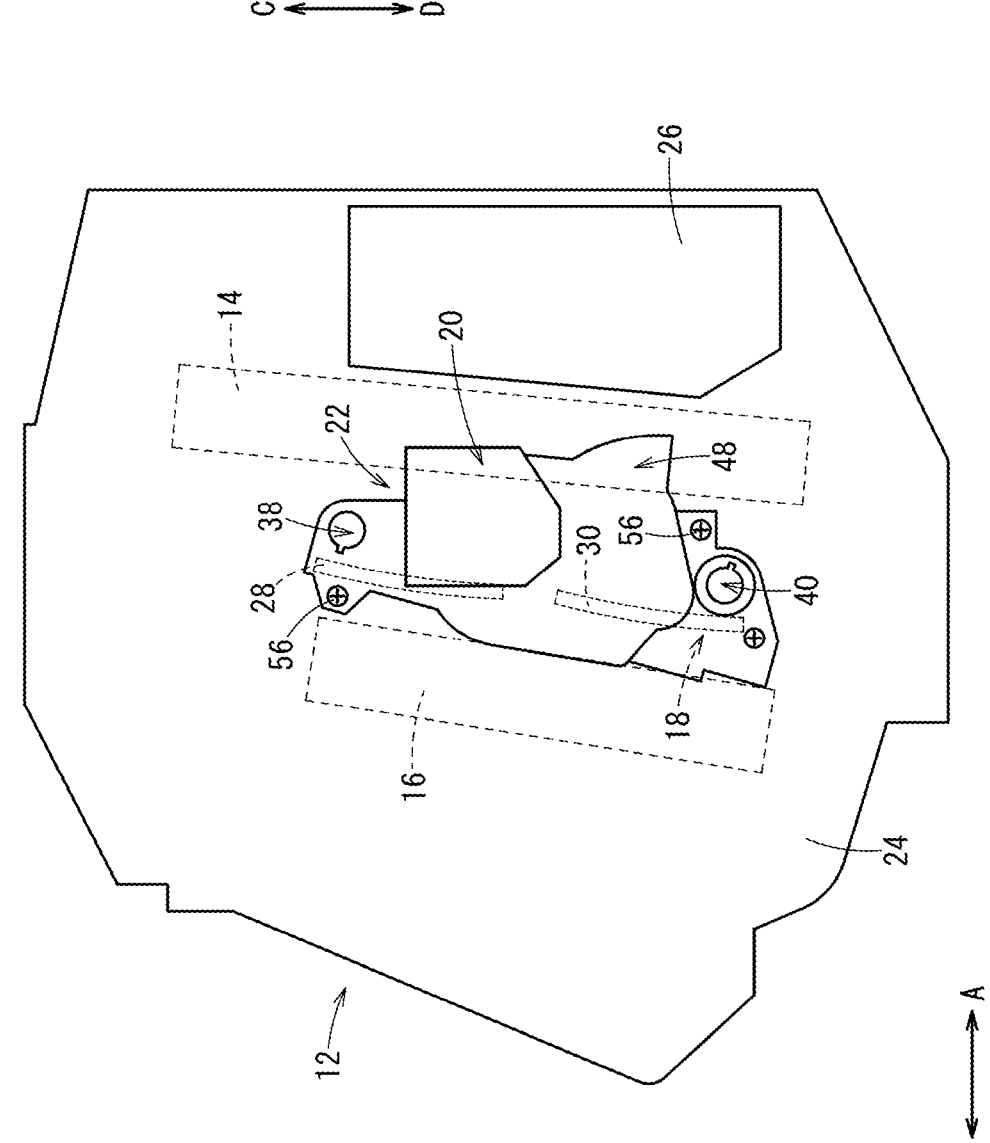
FIG. 1 is a front view of an entire vehicle air conditioning device to which a door drive device according to a first embodiment of the present invention is applied.

As illustrated in FIG. 1, a vehicle air conditioning device 10 includes an air conditioner case 12 including air passages (channels), an evaporator 14 disposed inside the air conditioner case 12 to cool the air, a heater core 16 heating the air, an air mixing mechanism 18 configured to mix hot air and cold air, temperatures of which are adjusted inside the air conditioner case 12, at a predetermined mixing ratio to thereby generate an air mixture thereof, and a door drive mechanism (door drive device) 22 transmitting driving force from a drive unit 20 disposed on a side surface of the air conditioner case 12 to the air mixing mechanism 18 to drive the air mixing mechanism 18.

The air conditioner case 12 has an intake port 26 for taking air in from an air blower (not illustrated), the intake port being formed at the most upstream position (in a direction of an arrow A) in a side wall 24 thereof located in the width direction. Inside the air conditioner case 12, the evaporator 14 is disposed downstream (in a direction of an arrow B) of the intake port 26, and the heater core 16 is disposed downstream (in the direction of the arrow B) of the evaporator 14. The air mixing mechanism 18 is disposed between the evaporator 14 and the heater core 16, and configured to adjust the flow rate and the flow state of the air that is introduced via the intake port 26 and flows downstream.

As illustrated in FIGS. 1 to 2B, the air mixing mechanism 18 includes a first air mixing door (door) 28 disposed at an upper position (in a direction of an arrow C) and a second air mixing door (door) 30 disposed below (in a direction of an arrow D) the first air mixing door 28.

The first and second air mixing doors 28 and 30 are, for example, plates each having a large radius arc in cross section and extending in the width direction of the air conditioner case 12 (direction of an arrow E in FIG. 2B). The first and second air mixing doors 28 and 30 are individually guided in the vertical direction (the directions of the arrows C and D) along guide portions (not illustrated) disposed on inner walls of the air conditioner case 12 facing in the width direction. More specifically, the first and second air mixing doors 28 and 30 are formed as sliding doors separately movable in the vertical direction (directions of the arrows C and D) inside the air conditioner case 12.

Moreover, the first and second air mixing doors 28 and 30 each include a rack gear 32 (see FIG. 2B) on the inner circumferential surface facing in the upstream direction, i.e., facing the evaporator 14. The rack gears 32 extend in the vertical direction (directions of the arrows C and D) at end portions of the first and second air mixing doors 28 and 30 in the width direction. The rack gears 32 are meshed with first and second shafts (door drive shafts) 38 and 40 described below.

Furthermore, seal members (seal portions) 34 are disposed at both ends of the first and second air mixing doors 28 and 30 in the moving direction of the first and second air mixing doors 28 and 30 and extend in the width direction (direction of the arrow E). The seal members 34, composed of a compressible elastic material such as urethane, have a rectangular cross-section and a predetermined length in the width direction (direction of the arrow E in FIG. 2B). As the first and second air mixing doors 28 and 30 move, the seal members 34 come into contact with wall portions (not illustrated) of the air conditioner case 12 to perform sealing.

More specifically, during maximum cooling illustrated in FIG. 2B where the first air mixing door 28 and the second air mixing door 30 are moved close to each other, the seal member 34 disposed at the lower end of the first air mixing door 28 and the seal member 34 disposed at the upper end of the second air mixing door 30 come into contact with a separator wall 36 disposed substantially in the middle of the air conditioner case 12 in the height direction, and are compressed.

On the other hand, during maximum heating where the first air mixing door 28 and the second air mixing door 30 are moved away from each other in the vertical direction (directions of the arrows C and D), the seal member 34 disposed at the upper end of the first air mixing door 28 comes into contact with a wall (not illustrated) disposed at an upper position inside the air conditioner case 12, and the seal member 34 disposed at the lower end of the second air mixing door 30 comes into contact with a wall (not illustrated) disposed at a lower position inside the air conditioner case 12.

The door drive mechanism 22 includes the first and second shafts 38, 40 rotatably disposed inside the air conditioner case 12 and configured to respectively drive the first and second air mixing doors 28, 30, and a link mechanism (link unit) 42 configured to transmit the driving force of the drive unit 20 to the first and second shafts 38, 40. The link mechanism 42 is disposed on one of the side walls 24 of the air conditioner case 12 in the width direction (which will hereinafter be simply referred to as "the side walls 24" or "the side walls 24 of the air conditioner case 12").

As illustrated in FIGS. 1 to 4C, both ends of the first and second shafts 38, 40 in the axial direction (direction of the arrow E) are rotatably supported by the side walls 24 of the air conditioner case 12. The first shaft 38 is disposed upstream of the first air mixing door 28 (in the direction of the arrow A), and the second shaft 40 is disposed upstream of the second air mixing door 30 (in the direction of the arrow A). The first shaft 38 and the second shaft 40 are disposed to be parallel to each other and to be separated from each other by a predetermined distance in the vertical direction (directions of the arrows C and D) with the separator wall 36 interposed between the shafts.

Moreover, the first and second shafts 38 and 40 each include a first gear portion (toothed portion) 44 with a plurality of gear teeth formed on an outer circumferential surface thereof disposed at each of both ends adjacent to the side walls 24 of the air conditioner case 12, and a second gear portion 46 with a plurality of gear teeth formed on the outer circumferential surface thereof disposed closer to the middle of the shaft in the axial direction than the first gear portion 44.

Furthermore, the first and second shafts 38 and 40 each include a positioning portion 47 protruding radially outward from an outer circumferential surface thereof at a position closer to the end than the first gear portion 44. The positioning portions 47 have, for example, a rectangular cross-section and a predetermined length in the axial direction of the first and second shafts 38 and 40 (direction of the arrow E). Each of the positioning portions 47 is spaced away from the first gear portion 44 by a predetermined distance L1 (see FIG. 4A) in a direction toward the end (distal end).

The link mechanism 42 includes, for example, a base member 48 attached to the outer side of the side wall 24 of the air conditioner case 12, a driving lever (lever) 50 (see FIG. 2A) disposed on the outer side of the base member 48 and pivoting under driving action of the drive unit 20, a driven lever (lever) 52 engaging with the driving lever 50 and driven in accordance with the movement of the driving lever 50, and a rack member 54 meshing with the driven lever 52 and moving linearly.

The base member 48 is formed of a board elongated in the vertical direction (directions of the arrows C and D) and is spaced by a predetermined distance from and in substantially parallel to the side wall 24 of the air conditioner case 12. Upper and lower ends of the base member 48 are fixed to the side wall 24 with a plurality of fixing bolts 56.

Moreover, the base member 48 has, in the vicinity of the upper end part, a first shaft hole (insertion hole) 58 in which the first shaft 38 is inserted, and also has, in the vicinity of the lower end part, a second shaft hole (insertion hole) 60 (see FIG. 3C) in which the second shaft 40 is inserted.

As illustrated in FIGS. 3A to 3C, the first and second shaft holes 58 and 60 each have a circular cross-section and pass through the base member 48 in the width direction of the air conditioner case 12 (direction of the arrow E). Guide grooves (groove portions) 62 extending radially outward are formed in the circumferential surfaces surrounding the first and second shaft holes 58 and 60. The positioning portions 47 of the first and second shafts 38 and 40 having, for example, a rectangular cross-section are inserted into the guide grooves 62. The positioning portions 47 will be described below.

Furthermore, the base member 48 includes guide portions 64a, 64b respectively protruding from outer edges of the first and second shaft holes 58, 60 toward the air conditioner case 12 at positions adjacent to the guide grooves 62. Each of the guide portions 64a, 64b extends straight from both sides of the guide groove 62 at positions in the circumferential direction of the first and second shaft holes 58 and 60. More specifically, each of the guide portions 64a, 64b is formed so as to interpose the guide groove 62 in the circumferential direction, and the guide portions 64a, 64b and the guide groove 62 extend straight in the width direction of the air conditioner case 12 (direction of the arrow E).

As shown in FIGS. 3A and 3B, the guide portion 64a for the first shaft hole 58 is disposed upstream of the first shaft hole 58 (in the direction of the arrow A), and includes a first guide piece 66a having a rectangular cross-section and disposed at an upper position (in the direction of the arrow C), and a second guide piece 68a having a tapered cross-section and disposed below the first guide piece 66a (in the direction of the arrow D) across the guide groove 62.

Figure 4A:
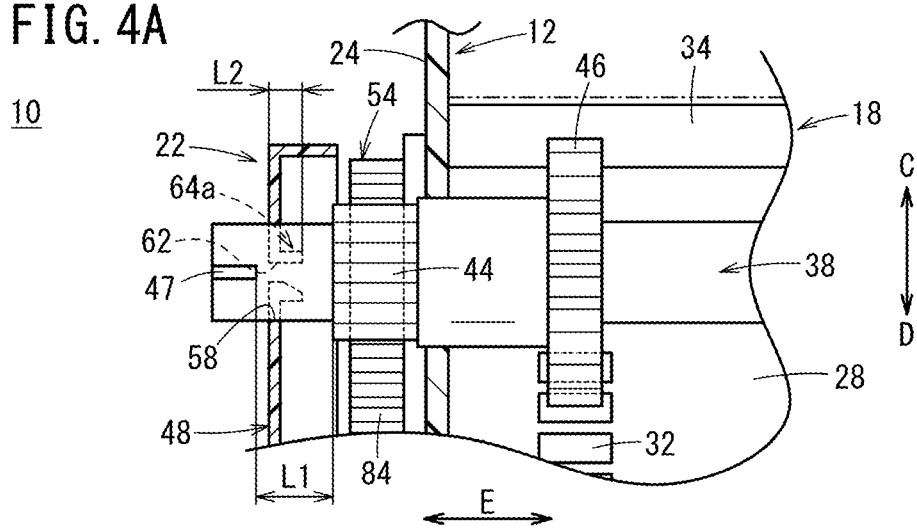
FIG. 4A is an enlarged cross-sectional view of the door drive device in the vicinity of the base member and an end of the first shaft.
Figure 4B:
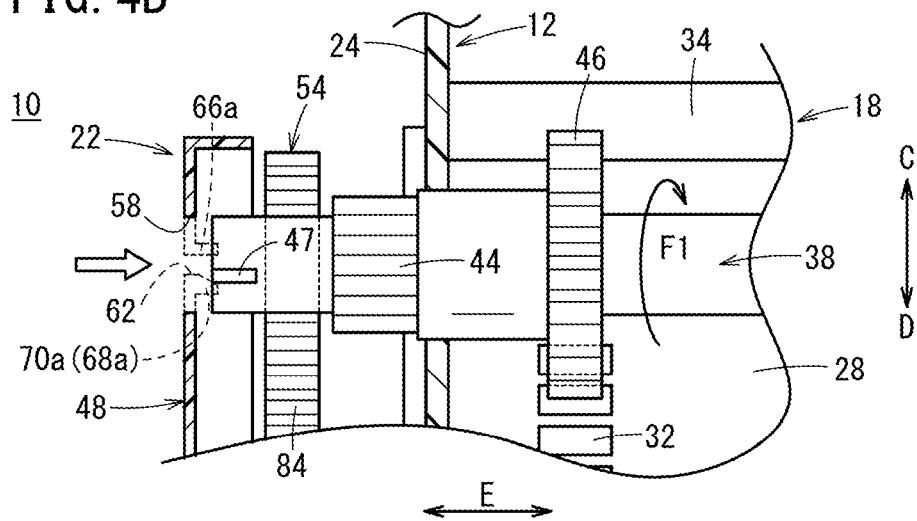
FIG. 4B is a view for illustrating an operation of assembling the base member and the first shaft.
Figure 4C:
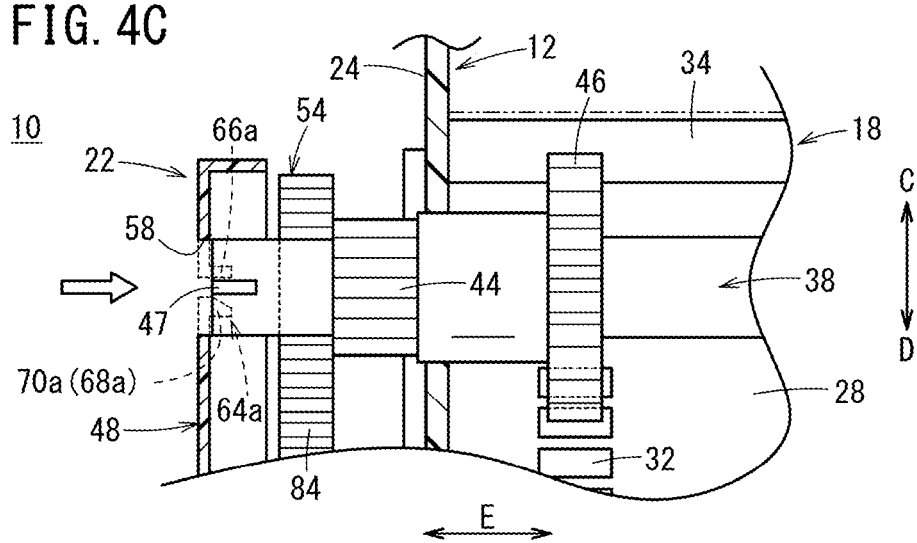
FIG. 4C is a view for illustrating the operation of assembling the base member and the first shaft.

The inner surface of the second guide piece 68a facing the first guide piece 66a is gradually inclined from the distal end to the base member 48 to form an inclined surface 70a. Thus, as illustrated in FIGS. 4A to 4C, the gap between the first guide piece 66a and the second guide piece 68a is largest at the distal end which is farthest from the base member 48 (adjacent to the air conditioner case 12).

On the other hand, as shown in FIG. 3C, the guide portion 64b for the second shaft hole 60 is disposed upstream of the second shaft hole 60 (in the direction of the arrow A), and includes a first guide piece 66b having a rectangular cross-section and disposed at a lower position (in the direction of the arrow D), and a second guide piece 68b having a tapered cross-section and disposed above the first guide piece 66b (in the direction of the arrow C) across the guide groove 62. That is, the guide portion 64a for the first shaft hole 58 and the guide portion 64b for the second shaft hole 60 are disposed such that the vertical positions of the second guide pieces 68a and 68b respectively including the inclined surfaces (inclined portions) 70a and 70b are inverted.

As illustrated in FIGS. 2A and 2B, the center of one end of the driving lever 50 is connected to a drive shaft 96 of the drive unit 20. Another end thereof extends linearly from the one end, and a link pin 72 (see FIG. 2A) is formed so as to protrude from the other end perpendicularly to a direction along which the driving lever 50 extends. The link pin 72 is substantially parallel to the drive shaft 96 of the drive unit 20 and is disposed adjacent to the side wall 24 of the air conditioner case 12. The driving lever 50 is disposed substantially centrally on the base member 48. The other end having the link pin 72 swings about the one end within a predetermined angle range under driving action of the drive unit 20.

The driven lever 52 is disposed on the inner side of the base member 48, i.e., on the air conditioner case 12 side. One end of the driven lever 52 is rotatably supported by a supporting portion 74 disposed in the vicinity of the lower end of the base member 48, and includes a link gear 76 with a plurality of gear teeth formed on the outer circumferential surface in the circumferential direction. The link gear 76 meshes with the first gear portion 44 of the second shaft 40 and also with a second rod gear 86 of the rack member 54 (described below).

Moreover, the driven lever 52 has a link slot 78 extending from the one end to another end, formed in a surface thereof, and the link pin 72 of the driving lever 50 disposed adjacent to the link slot 78 is inserted into the link slot 78. Thus, the other end of the driven lever 52 swings via the link pin 72 which is engaged with the link slot 78 under rotating action of the driving lever 50.

As illustrated in FIGS. 2A to 4C, the rack member 54 is disposed between the base member 48 and the side wall 24 of the air conditioner case 12. The rack member 54 faces the first and second shafts 38 and 40 and is guided so as to be linearly movable along the side wall 24.

The rack member 54 includes a first rod portion 80 disposed at one end thereof so as to face the first shaft 38 and a second rod portion 82 disposed at another end thereof so as to face the second shaft 40. A first rod gear 84 is formed on a side surface of the first rod portion 80 that faces the first shaft 38 (in the direction of the arrow A) and meshes with the first gear portion 44 of the first shaft 38. On the other hand, the second rod gear 86 is formed on a side surface of the second rod portion 82 that faces the second shaft 40 (in the direction of the arrow A) and meshes with the link gear 76 of the driven lever 52.

More specifically, the first and second rod gears 84 and 86 are cut in a direction orthogonal to the moving direction of the rack member 54, and are formed on the respective surfaces facing the first and second shafts 38 and 40.

Furthermore, as illustrated in FIGS. 2A and 2B, the rack member 54 is supported by first to third retaining portions 88, 90, and 92 and a hook portion 94, which protrude from the base member 48 toward the air conditioner case 12. The first retaining portion 88, the second retaining portion 90, and the hook portion 94 are in contact with (or abutment against) the rear surface of the rack member 54 which is opposite to a side surface facing the first and second shafts 38 and 40. The third retaining portion 92 is in contact with (or abutment against) the side surface opposite to the rear surface. The rack member 54 is supported to be linearly movable in the vertical direction (directions of the arrows C and D) under action of abutment against the first to third retaining portions 88, 90, and 92 and the hook portion 94.

The drive unit 20 is, for example, an actuator including the drive shaft 96 rotationally driven based on a control signal from a controller (not illustrated) and is secured on the outer side of the base member 48 substantially centrally in the height direction. The distal end of the drive shaft 96 protrudes toward the air conditioner case 12 via a hole (not illustrated) formed in the base member 48, and is connected to the center of the one end of the driving lever 50.

The vehicle air conditioning device 10 to which the door drive device according to the first embodiment of the present invention is applied is basically configured as above. Next, the assembly of the first and second shafts 38, 40 into the door drive mechanism 22 will be described. In the description below, the assembly of the first shaft 38 will be mainly described with reference to FIGS. 4A to 4C.

First, as illustrated in FIG. 2B, the first air mixing door 28 and the second air mixing door 30 are disposed close to each other inside the air conditioner case 12 (fully closed state), and the first and second shafts 38, 40 are disposed such that the second gear portions 46 mesh with the rack gears 32 of the first and second air mixing doors 28, 30 at predetermined positions. This causes the ends of the first and second shafts 38, 40 having the positioning portions 47 to protrude from the side wall 24 of the air conditioner case 12 outward in the width direction by a predetermined length.

Moreover, the link mechanism 42 of the door drive mechanism 22 is temporarily assembled such that the drive unit 20, the driving lever 50, the driven lever 52, and the rack member 54 are preassembled at predetermined positions with respect to the base member 48 (temporarily assembled state).

Then, the base member 48 of the door drive mechanism 22 is disposed substantially parallel to the side wall 24 of the air conditioner case 12 while the rack member 54 is disposed adjacent to the air conditioner case 12 and the drive unit 20 is disposed on the outer side of the base member 48. At this time, the first shaft hole 58 of the base member 48 is disposed so as to face an end of the first shaft 38 and the second shaft hole 60 of the base member 48 is disposed so as to face an end of the second shaft 40.

Next, when the door drive mechanism 22 is brought close to the air conditioner case 12 to insert the end of the first shaft 38 into the first shaft hole 58, the end is inserted in the axial direction while the positioning portion 47 of the first shaft 38 is in contact with the inclined surface 70a of the second guide piece 68a of the guide portion 64a as illustrated in FIG. 4B. This causes the first shaft 38 to be pushed by the inclined surface 70a of the base member 48 counterclockwise (in a direction of an arrow F1 in FIG. 2A) and thus forcibly rotated. The rotation of the first shaft 38 moves the first air mixing door 28 slightly downward (in the direction of the arrow D). As a result, the seal member 34 disposed at the lower end of the first air mixing door 28 is pressed against the separator wall 36 and then compressed. In addition, guiding of the positioning portion 47 of the first shaft 38 into the guide groove 62 through the gap between the first guide piece 66a and the second guide piece 68a of the base member 48 limits further rotation of the first shaft 38. In this manner, the first shaft 38 is maintained in a state where rotational force is applied in the counterclockwise direction (in the direction of the arrow F1).

At the same time, the second shaft 40 is inserted into the second shaft hole 60 and is pushed clockwise (in a direction of an arrow F2 in FIG. 2A) to be forcibly rotated by the positioning portion 47 sliding along the inclined surface 70b of the guide portion 64b. This causes the second air mixing door 30 to move slightly upward (in the direction of the arrow C). Thus, the seal member 34 disposed at the upper end of the second air mixing door 30 is pressed against the separator wall 36 and the compressed, and the positioning portion 47 is inserted into the guide groove 62 to thereby limit further rotation of the second shaft 40. In this manner, the second shaft 40 is maintained in a state where the clockwise rotational force is applied.

That is, the first and second air mixing doors 28 and 30 are assembled at a fully closed position where the seal members 34 at the lower end and the upper end are in contact with the separator wall 36 while being compressed.

Then, as illustrated in FIGS. 4B and 4C, the door drive mechanism 22 is brought closer to the air conditioner case 12, so that the first gear portion 44 of the first shaft 38 meshes with the first rod gear 84 of the rack member 54 and, at the same time, the first gear portion 44 of the second shaft 40 meshes with the link gear 76.

Finally, as illustrated in FIG. 4A, the positioning portions 47 of the first and second shafts 38, 40 protrude to the outer side of the base member 48 through the guide grooves 62, and thus the limitation in the rotational direction by the positioning portions 47 and the guide grooves 62 is removed. As a result, the first and second shafts 38, 40 are rotatably supported by the base member 48 via the first and second shaft holes 58, 60. The base member 48 is then secured to the side wall 24 of the air conditioner case 12 with the plurality of fixing bolts 56 (see FIGS. 1 and 2A). Thus, the assembly of the door drive mechanism 22 containing the base member 48 is completed.

In this manner, the first gear portion 44 of the first shaft 38 meshes with the first rod gear 84 of the rack member 54 in the door drive mechanism 22 at a predetermined position, and similarly the first gear portion 44 of the second shaft 40 meshes with the link gear 76 in the door drive mechanism 22 at a predetermined position.

Next, operations of the vehicle air conditioning device 10 including the door drive mechanism 22 into which the first and second shafts 38 and 40 are assembled as described above will be described.

First, full cooling operation for lowering the room temperature inside a vehicle cabin will be described.

First, air taken in under driving action of the air blower (not illustrated) is supplied to the passages inside the air conditioner case 12 through the intake port 26 based on the control signal from the controller (not illustrated) and the air passes through the evaporator 14. This causes the air to be cooled to a predetermined temperature by heat exchange.

Moreover, the drive unit 20 of the door drive mechanism 22 is driven based on the control signal from the controller (not illustrated) to rotate the drive shaft 96 in a predetermined direction. This causes the driving lever 50 to pivot counterclockwise (in the direction of the arrow F1 in FIG. 2A) and the link pin 72 to move along the link slot 78. As a result, the driven lever 52 starts pivoting counterclockwise about the one end thereof. The pivoting driven lever 52 causes the second shaft 40 to rotate clockwise (in the direction of the arrow F2) and also causes the rack member 54 to move linearly downward to thereby rotate the first shaft 38 counterclockwise (in the direction of the arrow F1).

Thus, as illustrated in FIG. 2A, the counterclockwise (in the direction of the arrow F1) rotation of the first shaft 38 lowers the first air mixing door 28, and the clockwise (in the direction of the arrow F2) rotation of the second shaft 40 raises the second air mixing door 30.

Then, as illustrated in FIG. 2B, the seal member 34 disposed at the lower end of the first air mixing door 28 and the seal member 34 disposed at the upper end of the second air mixing door 30 come into contact with the separator wall 36 to thereby close the upstream side of the heater core 16 by the first and second mixing doors 28, 30. As a result, the air cooled by the evaporator 14 (cold air) flows above and below the heater core 16 to make a detour so as to avoid the heater core 16 without flowing to the heater core 16, and is then supplied into the vehicle cabin through an air outlet port (not illustrated).

Next, to perform full heating operation for increasing the room temperature inside the vehicle cabin, the drive shaft 96 of the drive unit 20 rotates in a direction opposite to the direction during the cooling operation, based on the control signal from the controller (not illustrated). This causes the driving lever 50 to pivot clockwise (in the direction of the arrow F2 in FIG. 2A) and the link pin 72 to move along the link slot 78 of the driven lever 52. As a result, the driven lever 52 starts pivoting clockwise (in the direction of the arrow F2) about the one end thereof.

The pivoting driven lever 52 causes the second shaft 40 to rotate counterclockwise (in the direction of the arrow F1) and also causes the rack member 54 to move linearly upward to thereby rotate the first shaft clockwise (in the direction of the arrow F2). Thus, the rotation of the first shaft 38 raises the first air mixing door 28, and the rotation of the second shaft 40 lowers the second air mixing door 30.

Then, the first air mixing door 28 and the second air mixing door 30 are separated from each other to allow the downstream side of the evaporator 14 and the heater core 16 to communicate with each other (fully open state). As a result, the air cooled by the evaporator 14 (cold air) flows to the downstream heater core 16 through a space between the first air mixing door 28 and the second air mixing door 30 and is heated by the heater core 16 to generate hot air. The hot air is then supplied into the vehicle cabin through the air outlet port (not illustrated).

As described above, in the first embodiment, the door drive mechanism 22 for driving the first and second air mixing doors 28 and 30 of the vehicle air conditioning device 10 via the first and second shafts 38 and 40 includes the drive unit 20, the base member 48 disposed on the side wall 24 of the air conditioner case 12 in the width direction, and the link mechanism 42 including the driving lever 50 and the driven lever 52 supported by the base member 48. The first and second shafts 38, 40 are provided with the first gear portions 44 meshing respectively with the rack member 54 and the driven lever 52 of the link mechanism 42, and the positioning portions 47 disposed closer to the distal ends of the shafts than the first gear portions 44 so as to be spaced from the first gear portions 44 by a predetermined distance.

The first gear portions 44 can be meshed respectively with the first rod portion 80 of the rack member 54 and the link gear 76 of the driven lever 52 while the first and second shafts 38, 40 are positioned with respect to the base member 48 in the circumferential direction (rotational direction) by inserting the positioning portions 47 protruding radially outward from the first and second shafts 38, 40, into the respective guide grooves 62 formed on the first and second shaft holes 58, 60 of the base member 48.

As a result, the gears are easily and reliably positioned and meshed with each other at the predetermined positions using a simple structure in which the positioning portions 47 are inserted into the guide grooves 62 of the base member 48 without providing the first gear portions 44 of the first and second shafts 38, 40, the first rod gear 84 of the rack member 54, the link gear 76 of the driven lever 52, etc., with a larger tooth thickness or a specific shape. This facilitates the installation of the door drive mechanism 22 into the first and second shafts 38 and 40, and the reliable engagement (meshing) of the shafts enables the driving force from the drive unit 20 to be reliably transmitted to the first and second shafts 38, 40, thereby preventing disengagement.

Moreover, since the first gear portions 44 of the first and second shafts 38, 40, the rod gears of the rack member 54, and the like do not require thick teeth or a specific shape, operating resistance occurring when the driving force is transmitted from the rack member 54 and the driven lever 52 to the first and second shafts 38, 40, can be reduced. Thus, the transmission efficiency in transmitting the driving force to the first and second shafts 38, 40 can be increased, so that the first and second air mixing doors 28, 30 can be smoothly opened and closed.

Furthermore, the base member 48 is provided with the first and second shaft holes 58, 60 into which the first and second shafts 38, 40 are respectively inserted, the guide grooves 62 formed around the first and second shaft holes 58, 60, and the guide portions 64a, 64b each having guide pieces which are disposed at an interval in the circumferential direction and protrude straight so as to interpose the guide groove 62, the guide portions being configured to guide the positioning portions 47 toward the guide grooves 62. Thus, the first and second shafts 38, 40 can be easily and reliably rotated in desired directions and assembled by inserting the first and second shafts 38, 40 into the first and second shaft holes 58, 60, respectively, and by sliding the positioning portions 47 on the inclined surfaces 70a, 70b of the guide portions 64a, 64b, respectively, in the axial direction.

Yet moreover, as illustrated in FIG. 4A, the distance L1 between the positioning portions 47 and the first gear portions 44 of the first and second shafts 38, 40 in the axial direction (direction of the arrow E) is larger than a length L2 of the guide portions 64a and 64b of the base member 48 in the axial direction (L1>L2). Thus, when the positioning portions 47 are inserted into the guide portions 64a, 64b and exposed to the outside of the base member 48 through the guide grooves 62, the first gear portions 44 are prevented from coming into contact with the guide portions 64a, 64b.

Consequently, the first and second shafts 38, 40 can be rotatably supported by the base member 48 after the first and second shafts 38, 40 have been positioned at the predetermined positions with respect to the base member 48 by action of the positioning portions 47 and the guide portions 64a, 64b.

Yet moreover, the link mechanism 42 is provided with the rack member 54 connecting the first shaft 38 with the driven lever 52 to which the driving force is transmitted from the driving lever 50. This enhances the volumetric efficiency compared with a case where the driving force is transmitted only by the driving lever 50 and the driven lever 52.

Furthermore, when the door drive mechanism 22 is attached to the side wall 24 of the air conditioner case 12 in the width direction, the positioning portions 47 of the first and second shafts 38, 40 are guided by the guide grooves 62. Thus, the first gear portion 44 of the first shaft 38 can be meshed with the first rod gear 84 of the rack member 54 at the predetermined position, and the first gear portion 44 of the second shaft 40 can be meshed with the link gear 76 of the driven lever 52 at the predetermined position.

Yet moreover, by attaching the door drive mechanism 22 to the first and second shafts 38, 40, assembly of the door drive mechanism can be completed in a fully closed state (fully closed position) where the first and second shafts 38, 40 rotate in the predetermined directions with respect to the air conditioner case 12, and the first air mixing door 28 and the second air mixing door 30 are moved toward each other by the rotational force.

Thus, when operational tests are carried out on the first and second air mixing doors 28, 30 after the door drive mechanism 22 is installed in the vehicle air conditioning device 10, the operation check can be completed by only two processes, that is, moving the first air mixing door 28 and the second air mixing door 30 in a direction away from each other (i.e., the fully open position) and returning the doors to the fully closed position.

In a case where assembly of the first and second air mixing doors 28, 30 are completed in a middle position state where the doors are positioned between the fully open position and the fully closed position and the operation check is started with the middle position state, for example, the operation check requires three processes, that is, a full opening operation, a full closing operation from the full opening operation, and another full opening operation from the full closing operation. Thus, according to the present embodiment, since assembling is completed in the fully closed position state, reduction in the number of processes required for the operation check can be achieved. Note that the assembly may be completed in the fully open position state of the first and second air mixing doors 28, 30, instead of the fully closed position state.

Yet moreover, the first and second air mixing doors 28, 30 include the elastically deformable seal members 34 at the ends thereof in the moving directions, and assembly can be carried out while the rotational forces in the predetermined directions are being applied to the first and second shafts 38, 40 by inserting the positioning portions 47 of the first and second shafts 38, 40 along the inclined surfaces 70a, 70b of the guide portions 64a, 64b, respectively, of the base member 48.

Owing to the above configuration, the seal members 34 can be brought into abutment against the separator wall 36 of the air conditioner case 12 while being compressed by pushing the seal members 34 against the separator wall 36. Thus, the first and second air mixing doors 28, 30 can also be reliably assembled at the fully closed position while being pressed against the separator wall 36, against the elastic force of the seal members 34.

Moreover, the first and second air mixing doors 28, 30 to which the door drive mechanism 22 transmits the driving force are formed as sliding doors slidable in the vertical direction along the side wall 24 of the air conditioner case 12. Although the moving amounts of the sliding doors directly caused by the rotation amounts of the first and second shafts 38, 40 are small, the door drive mechanism 22 can appropriately amplifies and transmits the driving force to the sliding doors to thereby increase the moving amounts of the doors.

Next, a vehicle air conditioning device 110 to which a door drive device according to a second embodiment is applied will be described with reference to FIGS. 5A to 5D. The same reference numerals and symbols are used for components identical to those in the above-described vehicle air conditioning device 10 to which the door drive device according to the first embodiment is applied, and the detailed descriptions will be omitted.

As shown in FIGS. 5A to 5D, in the vehicle air conditioning device 110 according to the second embodiment, a first shaft (door drive shaft) 112 includes a large diameter portion 114 disposed at an end thereof and a small diameter portion (narrow shaft portion) 116 disposed between the large diameter portion 114 and the first gear portion 44. The large diameter portion 114 is provided with a first guide groove 117 and a second guide groove (groove portion) 120. The first guide groove 117 extends in the axial direction of the first shaft 112 and has one end that faces the small diameter portion 116. The second guide groove 120 is located at another end of the first guide groove 117 and has an inclined surface (inclined portion) 118 gradually inclined to the center, toward the first guide groove 117. Similarly, a second shaft (not illustrated) also includes the large diameter portion 114, the small diameter portion 116, and the first and second guide grooves 117, 120.

On the other hand, a door drive mechanism (door drive device) 122 applied to the vehicle air conditioning device 110 includes a protruding portion (positioning portion) 128 protruding radially inward from the inner circumferential surface of a first shaft hole (insertion hole) 126 of a base member 124. The protruding portion 128 protrudes toward the center of the first shaft hole 126. As is the first shaft hole 126, a second shaft hole (not illustrated) of the base member 124 is also provided with the protruding portion 128.

Figure 5A:
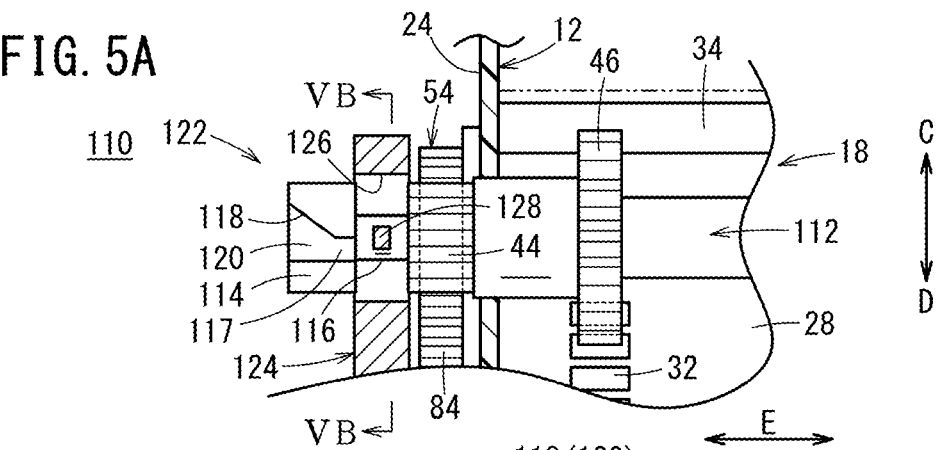
FIG. 5A is an enlarged cross-sectional view of a door drive device according to a second embodiment in the vicinity of a base member and an end of a first shaft.
Figure 5B:
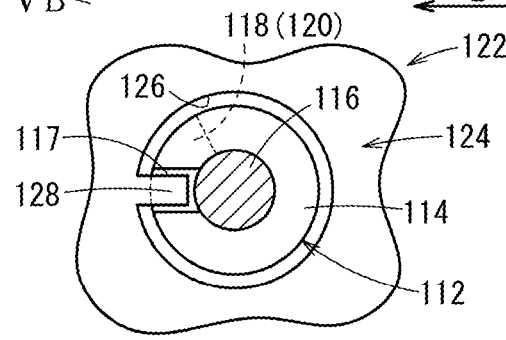
FIG. 5B is a cross-sectional view taken along line VB-VB in FIG. 5A.
Figure 5C:
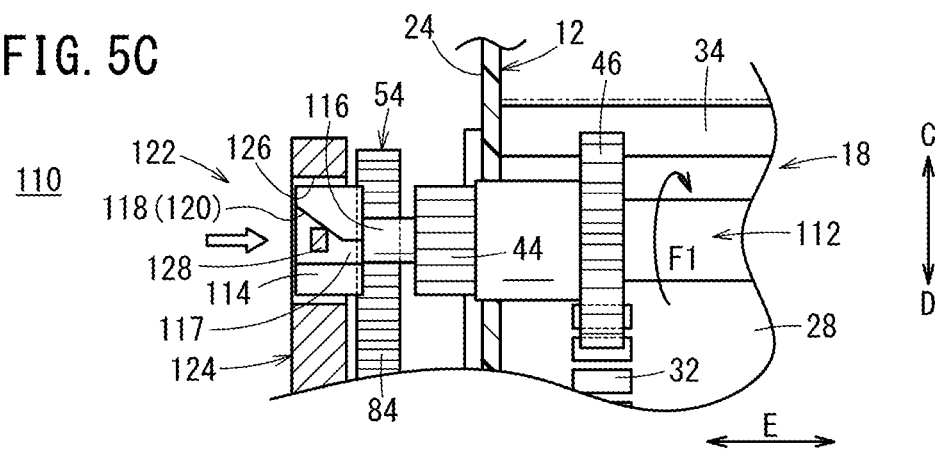
FIG. 5C is a view for illustrating an operation of assembling the base member and the first shaft.

To attach the above-described door drive mechanism 122 to the air conditioner case 12 of the vehicle air conditioning device 110, first, as illustrated in FIG. 5C, the distal end of the first shaft 112 is inserted into the first shaft hole 126 such that the protruding portion 128 comes into contact with the inclined surface 118 of the second guide groove 120.

The inclined surface 118 is pushed by the protruding portion 128 by bringing the base member 124 of the door drive mechanism 122 closer to the air conditioner case 12, and thus the first shaft 112 is forcibly rotated counterclockwise (in the direction of the arrow F1). This causes the first air mixing door 28 to move slightly downward (in the direction of the arrow D).

In other words, a counterclockwise rotational force is applied to the first shaft 112 by attaching the base member 124 to the air conditioner case 12.

Figure 5D:
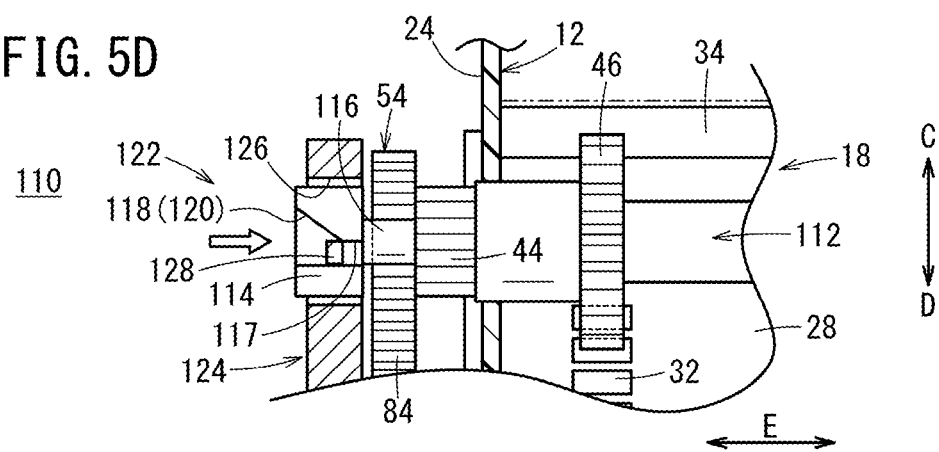
FIG. 5D is a view for illustrating the operation of assembling the base member and the first shaft.

As the protruding portion 128 advances along the inclined surface 118 of the second guide groove 120, the first shaft 112 is further rotated. When the protruding portion 128 is inserted into the first guide groove 117 as illustrated in FIG. 5D, further rotation is limited, and the first shaft 112 is maintained in a state where the counterclockwise rotational force is applied. The first gear portions 44 is meshed with the first rod gear 84 of the rack member 54 by bringing the base member 124 even closer to the air conditioner case 12.

Moreover, as illustrated in FIG. 5A, when the protruding portion 128 passes over the inclined surface 118 and reaches the small diameter portion 116, the rotational force applied to the first shaft 112 is removed, and the first shaft 112 is rotatably held by the first shaft hole 126.

Furthermore, at the same time, the second shaft is forcibly rotated clockwise by the protruding portion 128 by inserting the second shaft into the second shaft hole. This causes the second air mixing door to move slightly upward, whereby the seal member 34 at the upper end is pressed against the separator wall.

As a result, the first air mixing door 28 (second air mixing door) is assembled at the fully closed position where the seal member 34 is compressed and in abutment against the separator wall.

That is, the first shaft hole 126 (second shaft hole) of the door drive mechanism 122 may have a recessed guide groove, and the first shaft 112 (second shaft) may have the positioning portion protruding radially outward on the outer circumference of the distal end thereof, whereby relative positioning in the rotational direction may be carried out. Alternatively, as in the door drive mechanism 122 described above, the first shaft hole 126 (second shaft hole) may have the protruding portion 128 protruding radially inward, and the first shaft 112 (second shaft) may have, at a distal end thereof, the second guide groove 120 recessed radially inward, whereby the relative positioning in the rotational direction may be carried out.

Next, a vehicle air conditioning device 130 to which a door drive device according to a third embodiment is applied will be described with reference to FIG. 6. The same reference numerals and symbols are used for components identical to those in the above-described vehicle air conditioning devices 10 and 110 to which the door drive devices according to the first and second embodiments, respectively, are applied, and the detailed descriptions will be omitted.

Figure 6:
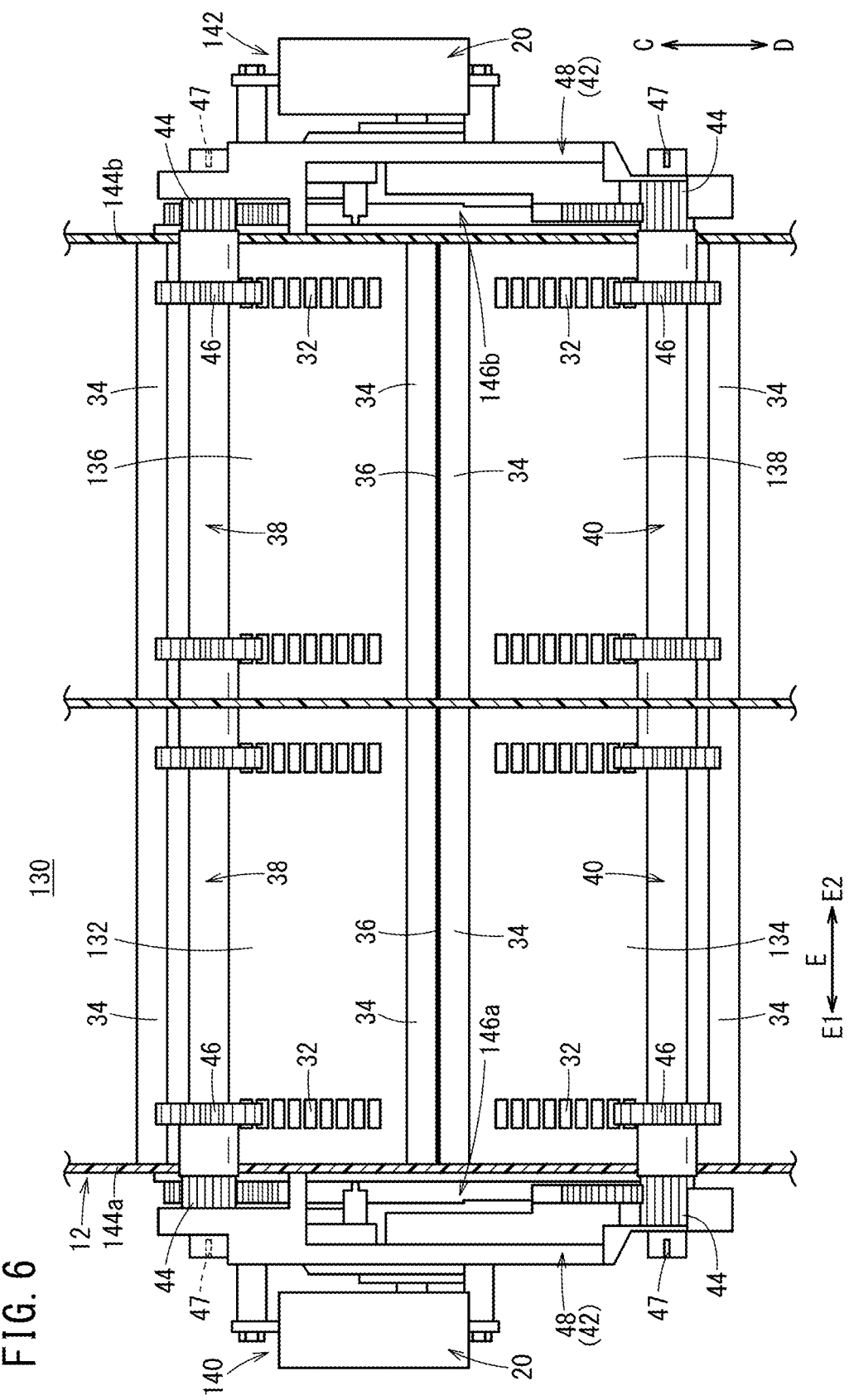
FIG. 6 is a cross-sectional view of an entire vehicle air conditioning device to which a door drive device according to a third embodiment of the present invention is applied.

As illustrated in FIG. 6, the vehicle air conditioning device 130 can individually adjust the temperature on the driver's seat side and the temperature on the passenger seat side inside the cabin. The vehicle air conditioning device 130 includes first and second air mixing doors (doors) 132, 134 disposed on one side in the width direction (direction of an arrow E1) and third and fourth air mixing doors (doors) 136, 138 disposed on another side in the width direction (direction of an arrow E2) inside the air conditioner case 12, and also includes a first door drive mechanism (door drive device) 140 for driving the first and second air mixing doors 132, 134 and a second door drive mechanism (door drive device) 142 for driving the third and fourth air mixing doors 136, 138.

The first and second door drive mechanisms 140, 142 are formed of identical components. The first door drive mechanism 140 is attached to a side wall 144a of the air conditioner case 12 located on the one side in the width direction (direction of the arrow E1), and the second door drive mechanism 142 is attached to a side wall 144b of the air conditioner case 12 located on the other side in the width direction (direction of the arrow E2).

The first and second air mixing doors 132, 134 are opened and closed under the driving action of the first door drive mechanism 140, to thereby switch a flowing state of air sent to the driver's seat side inside the vehicle cabin. Further, the third and fourth air mixing doors 136, 138 are opened and closed under the driving action of the second door drive mechanism 142, to thereby switch a flowing state of air sent to the passenger seat side inside the cabin.

That is, the temperature of the air sent to the driver's seat side and the temperature of the air sent to the passenger seat side can be separately adjusted by separately driving the first door drive mechanism 140 and the second door drive mechanism 142.

As described above, in the vehicle air conditioning device 130 according to the third embodiment, the pair of first and second door drive mechanisms 140, 142 are disposed on either side in the width direction to thereby separately drive the first and second air mixing doors 132, 134 and the third and fourth air mixing doors 136, 138. This allow a rack member 146a of the first door drive mechanism 140 and a rack member 146b of the second door drive mechanism 142 to have the same shape, thereby promoting commonality of the components.

Owing to the above configuration, the production costs of the first and second door drive mechanisms 140, 142 can be reduced, and the assembly of the first and second door drive mechanisms 140, 142 into the air conditioner case 12 can be facilitated.

The door drive device according to the present invention is not limited in particular to the embodiments described above, and may have various structures without departing from the scope of the present invention as a matter of course.

What is claimed is:

1. A door drive device comprising:
   an air conditioner case including a channel inside the air conditioner case;
   a plurality of doors disposed in the channel and configured to adjust an opening degree of the channel;
   a plurality of door drive shafts configured to drive the doors; and
   a link unit connected to the door drive shafts, wherein:
   the link unit includes a drive unit, a base member secured to the air conditioner case, and a plurality of levers supported by the base member;

each of the door drive shafts includes a toothed portion and a positioning portion, the toothed portion being disposed in a vicinity of an end of the door drive shaft and configured to mesh with the link unit, the positioning portion being disposed between the toothed portion and the end so as to be spaced away from the toothed portion by a predetermined distance and to protrude radially outward;

the base member includes insertion holes in which the door drive shafts are inserted respectively, groove portions formed around the respective insertion holes and configured to allow the respective positioning portions to be inserted into the respective groove portions, and guide portions including respective inclined portions configured to guide the respective positioning portions to the respective groove portions; and a distance between each of the positioning portions and each of the toothed portions is larger than a length of each of the guide portions, in an axial direction of each of the door drive shafts.

2. The door drive device according to claim 1, wherein the link unit includes a rack member connecting the door drive shafts and the levers.

3. The door drive device according to claim 2, wherein:
the link unit comprises two link units;
the two link units are attached to two respective opposing surfaces of the air conditioner case in a direction substantially perpendicular to a flow direction of air; and
the rack member of one of the link units and the rack member of another link unit have an identical shape.

4. The door drive device according to claim 2, wherein:
each of the door drive shafts is located at a predetermined position when the positioning portion slides along the groove portion during attachment of the link unit; and
a toothed portion of one of the levers of the link unit or a toothed portion of the rack member meshes with a toothed portion of the door drive shaft when the positioning portion comes into contact with an end of the groove portion.

5. The door drive device according to claim 4, wherein the doors fully open or fully close the channel when the door drive shafts are located at predetermined positions.

6. The door drive device according to claim 5, wherein:
each of the doors includes a seal portion configured to elastically deform in a direction along which the door moves when the channel is fully opened or fully closed; and
each of the doors is displaced to a fully open position or to a fully closed position while elastically deforming the seal portion when the door drive shaft is guided to a predetermined position by the inclined portion.

7. The door drive device according to claim 6, wherein each of the doors is a sliding door including a door portion configured to close the channel and the door drive shaft that is a component separate from the door portion.

8. A door drive device comprising:
an air conditioner case including a channel inside the air conditioner case;
a plurality of doors disposed in the channel and configured to adjust an opening degree of the channel;
a plurality of door drive shafts configured to drive the doors; and
a link unit connected to the door drive shafts, wherein:
the link unit includes a drive unit, a base member secured to the air conditioner case, and a plurality of levers supported by the base member;
the base member includes insertion holes in which the door drive shafts are inserted respectively, and positioning portions formed respectively on inner circumferences of the insertion holes and protruding toward the respective door drive shafts; and
each of the door drive shafts includes a groove portion extending in an axial direction and configured to allow the positioning portion to be inserted into the groove portion, an inclined portion disposed in the groove portion and configured to be inclined with respect to an axis of the door drive shaft from one end to another end of the groove portion to thereby guide the positioning portion, and a narrow shaft portion disposed at the other end of the groove portion, wherein the narrow shaft portion is not in contact with the positioning portion when the link unit is secured to the air conditioner case.

9. The door drive device according to claim 8, wherein the link unit includes a rack member connecting the door drive shafts and the levers.

10. The door drive device according to claim 9, wherein:
the link unit comprises two link units;
the two link units are attached to two respective opposing surfaces of the air conditioner case in a direction substantially perpendicular to a flow direction of air; and
the rack member of one of the link units and the rack member of another link unit have an identical shape.

11. The door drive device according to claim 9, wherein:
each of the door drive shafts is located at a predetermined position when the positioning portion slides along the groove portion during attachment of the link unit; and
a toothed portion of one of the levers of the link unit or a toothed portion of the rack member meshes with a toothed portion of the door drive shaft when the positioning portion comes into contact with an end of the groove portion.

12. The door drive device according to claim 11, wherein the doors fully open or fully close the channel when the door drive shafts are located at predetermined positions.

13. The door drive device according to claim 12, wherein:
each of the doors includes a seal portion configured to elastically deform in a direction along which the door moves when the channel is fully opened or fully closed; and
each of the doors is displaced to a fully open position or to a fully closed position while elastically deforming the seal portion when the door drive shaft is guided to a predetermined position by the inclined portion.

14. The door drive device according to claim 13, wherein each of the doors is a sliding door including a door portion configured to close the channel and the door drive shaft that is a component separate from the door portion.

* * * * *